United States Patent
Ma

(10) Patent No.: US 6,227,151 B1
(45) Date of Patent: May 8, 2001

(54) GASOLINE INTERNAL COMBUSTION ENGINE

(75) Inventor: Thomas Tsoi Hei Ma, Woodham Ferrers (GB)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/463,084

(22) PCT Filed: Feb. 11, 1998

(86) PCT No.: PCT/GB98/00614
§ 371 Date: Jan. 19, 2000
§ 102(e) Date: Jan. 19, 2000

(87) PCT Pub. No.: WO99/06683
PCT Pub. Date: Feb. 11, 1999

(30) Foreign Application Priority Data

| Aug. 1, 1997 | (GB) | 9716157 |
| Aug. 9, 1997 | (GB) | 9716829 |
| Aug. 29, 1997 | (GB) | 9718209 |

(51) Int. Cl.⁷ .................................................. F02B 43/08
(52) U.S. Cl. ........................ 123/3; 123/430; 123/557
(58) Field of Search .............................. 123/430, 3, 557

(56) References Cited

U.S. PATENT DOCUMENTS

| 3,824,965 | * | 7/1974 | Clawson | 123/275 |
| 4,425,892 | * | 1/1984 | Firey | 123/430 |
| 4,960,089 | * | 10/1990 | Kono et al. | 123/260 |

FOREIGN PATENT DOCUMENTS

WO-88/00650 * 1/1988 (WO).
WO-97/20133 * 6/1997 (WO).

* cited by examiner

*Primary Examiner*—Noah P. Kamen
(74) *Attorney, Agent, or Firm*—Jerome R. Drouillard

(57) ABSTRACT

The invention relates to a gasoline internal combustion spark ignition engine having a fuel fractioning system that separates the gasoline fuel by boiling point into at least two, preferably three, fractions. The different fuel fractions are separately supplied to the combustion chamber of the engine in such a manner as to achieve in each cylinder a two-zone stratification of the charge at the instant of spark when the engine is operating at low and medium loads. The two-zone stratification consists of two contiguous mixture clouds, a first of the two clouds lying in the vicinity of the spark plug and containing a higher concentration of the higher boiling point fuel fraction than the second cloud lying at a distance from the spark plug. The average composition of the fuel and the fuel-to-air ratio in the second cloud are such that the second cloud undergoes auto-ignition subsequent to the instant of spark ignition of the first cloud. The auto-ignition of the second cloud is brought about by the increased temperature and pressure resulting from the advancing flame front in the first cloud and the timing of the auto-ignition of the second cloud occurs at a predetermined time delay after the instant of spark ignition of the first cloud.

9 Claims, 2 Drawing Sheets

GASOLINE INTERNAL COMBUSTION ENGINE

FIELD OF THE INVENTION

The present invention relates to a stratified charge internal combustion gasoline engine having a fuel fractioning system supplied with a blend of gasoline fuel from a fuel storage tank.

BACKGROUND OF THE INVENTION

U.S. Pat. No. 4,205,647 describes a fuel fractioning system for creating a "multi-regional" stratified charge in the intake system of an internal combustion engine. The multi-regional stratification is assumed to remain intact with minimum mixing when it is drawn from the intake system into the combustion chamber of the engine. The aim is to create a large number of discrete pockets of charge containing different fuel types and fuel concentrations randomly spaced from one another and distributed throughout the volume of the combustion chamber. Each pocket may be ignitable by a spark but must be ignitable by compression ignition. The pressure waves created by the ignition and combustion of these pockets are individually small and scattered out of phase with one another thereby avoiding the abrupt and intense pressure rise which is characteristic of a conventional spark ignition engine undergoing knocking combustion when a large proportion of its charge auto-ignites all at once.

In the above proposal, the positions of the discrete pockets in relation to a spark plug (if present) are randomised in space and time and will not be repeatable for every engine cycle. If a spark is fired, there is a probability that a pocket near the spark may not be ignitable by spark ignition but this pocket will later be ignitable by compression ignition. If a pocket is ignitable by a spark, the combustion that follows may reach an adjacent pocket and continue by flame propagation if the adjacent pocket is also ignitable. On the other hand, if the adjacent pocket is too lean, the flame propagation will stop but the pocket will later be ignitable by compression ignition. The pressure wave created by the combustion of any one pocket, being small and spread out across the whole combustion chamber, will be very weak and will not be sufficient to cause compression ignition of the adjacent pockets, though these pockets will be ignitable later by the bulk compression of the charge driven by the engine piston.

It is clear in the above proposal that the spark timing cannot be used as a reliable control of the ignition timing of the overall charge. Instead, the effective ignition timing of the charge is controlled by the average compression ignition time delay characteristics of the individual pockets and it is the bulk compression ratio of the engine that ultimately determines the timing of the auto-ignition. The disadvantage however is that the effective ignition timing of the multi-regional stratified charge of the above proposal will vary with temperature, pressure and composition of the charge during the compression process, occurring at any time when the charge is ready to auto-ignite, but not necessarily at a time within the engine cycle appropriate for optimum thermal efficiency. This is to be contrasted with a conventional spark ignition engine or compression ignition (diesel injection) engine where the ignition timing of the charge can be chosen at will over a wide range within the engine cycle to meet the requirement of optimum thermal efficiency by simply imposing at the desired timing a spark or a fuel injection, as the case may be.

The foregoing discussion is based on the initial postulation made in the above proposal that the multi-regional stratification created in the intake system of the engine will remain intact with minimum mixing when it is drawn from the intake system into the combustion chamber. In reality this is almost impossible to achieve because the intake charge will be stretched and squeezed as it flows past the intake valve and will be overlapped and agitated as it is trapped and compressed in the engine cylinder. The multi-regional stratification that may be present in the intake system will be substantially well mixed by turbulence and vortex break-up by the time the charge is trapped and compressed in the combustion chamber. Consequently, the above proposal is an idealised concept which is difficult to reproduce in practice.

OBJECT OF THE INVENTION

The present invention aims to achieve effective and accurate control of the ignition timing of the overall charge in a spark ignition internal combustion engine operating at least in part in a premixed charge auto-ignition mode during low and medium load operating conditions.

SUMMARY OF THE INVENTION

In accordance to a first aspect of the invention, there is provided a method of operating a gasoline internal combustion spark ignition engine, which comprises separating the gasoline fuel by boiling point into at least two fractions, and separately supplying the fuel fractions to the combustion chamber of the engine in such a manner as to achieve in each cylinder a two-zone stratification of the charge at the instant of spark when the engine is operating at low and medium loads, the two-zone stratification consisting of two contiguous mixture clouds, a first of the two clouds lying in the vicinity of the spark plug and containing a higher concentration of the higher boiling point fuel fraction than the second cloud lying at a distance from the spark plug, the average composition of the fuel and the fuel-to-air ratio in the said second cloud being such that the second cloud undergoes auto-ignition subsequent to the instant of spark ignition of the first cloud, the auto-ignition of the second cloud being brought about by the increased temperature and pressure resulting from the advancing flame front in the first cloud and the timing of the auto-ignition of the second cloud thereby occurring at a predetermined time delay after the instant of spark ignition of the first cloud.

In accordance to a second aspect of the invention, there is provided a gasoline internal combustion spark ignition engine having a fuel fractioning system for separating the gasoline fuel by boiling point into at least two fractions, and means for separately supplying the fuel fractions to the combustion chamber of the engine in such a manner as to achieve in each cylinder a two-zone stratification of the charge at the instant of spark when the engine is operating at low and medium loads, the two-zone stratification consisting of two contiguous mixture clouds, a first of the two clouds lying in the vicinity of the spark plug and containing a higher concentration of the higher boiling point fuel fraction than the second cloud lying at a distance from the spark plug, the average composition of the fuel and the fuel-to-air ratio in the said second cloud being such that the second cloud undergoes auto-ignition subsequent to the instant of spark ignition of the first cloud, the auto-ignition of the second cloud being brought about by the increased temperature and pressure resulting from the advancing flame front in the first cloud and the timing of the auto-ignition of the second cloud thereby occurring at a predetermined time delay after the instant of spark ignition of the first cloud.

It is preferred to separate the gasoline fuel into three fractions, namely low, medium and high boiling point fractions. The medium boiling point fuel fraction preferably comprises the components of the fuel having boiling points in the approximate temperature range from 40° C. to 100° C., the low and high boiling point fuel fractions comprising the remaining components of the fuel having boiling points below and above this temperature range, respectively.

The medium boiling point fraction of the gasoline fuel forms a significant proportion of the fuel volume (approximately 60% by volume) and has a significantly lower research octane number (approximately 80 RON) than the average research octane number (95 RON) of the total fuel blend. This fraction of the fuel, when mixed with air, is more susceptible to auto-ignition than the remaining fractions and the present invention sets out to concentrate this fraction in the second cloud at a distance from the spark plug so that it should undergo controlled auto-ignition under certain operating conditions.

The high boiling point fraction has a higher octane number (up to 120 RON) and typically forms some 35% of the fuel volume. If this fuel fraction is concentrated in the first cloud lying in the vicinity of the spark plug to form an ignitable mixture, then it ensures reliable ignition of the first cloud under all operating conditions determined by the spark timing, and subsequent auto-ignition of the second cloud after a predetermined time delay as the latter is being compressed by the advancing flame front in the first cloud. In this way, the whole cylinder charge is burnt within an optimum combustion period and at the correct timing for best thermal efficiency with the engine operating at least in part in the controlled auto-ignition mode producing very low NOx emissions.

In a preferred embodiment of the invention, exhaust gases are recirculated to the engine, either externally or internally. In addition to the stratification of fuel composition described above, it is possible for the concentration of EGR gases to be stratified into two zones one near and the other distant from the spark plug and the higher concentration of EGR gases can be located either in the first cloud lying near the spark plug or in the other cloud, each of these offering different advantages depending upon the prevailing engine operating conditions.

If the higher concentration of EGR gas lies in the first cloud, the NOx emissions are reduced as a result of the slower flame propagation speed in the first cloud. Furthermore the stratified EGR gases, being hot and containing active radicals surviving from the previous cycle, is known to be effective in triggering auto-ignition sooner in the adjacent second cloud without requiring the compression ratio of the engine to be significantly increased. If, on the other hand, the higher concentration of EGR gases lies in the second cloud, the hot EGR gases are mixed directly with the medium boiling point fuel fraction in the second cloud making it even more susceptible to autoignition.

The invention aims to achieve controlled auto-ignition at an optimum timing within a substantial part of the intake charge during low and medium engine load operation and for a wide range of engine speeds. The advantage of achieving auto-ignition combustion during such conditions is that the NOx emission produced is significantly lower than that produced conventionally by a spark ignition gasoline engine while the fuel consumption is as low as that of a compression ignition diesel engine.

In a preferred embodiment of the invention, the high boiling point fuel fraction is injected as a liquid into a predetermined region of the engine intake system such that it is subsequently drawn into the combustion chamber to form a stratified cloud in the vicinity of the spark plug. Alternatively, the high boiling point fuel fraction may be injected as a liquid directly into the combustion chamber towards a region in the vicinity of the spark plug during the later part of the engine compression period to form a stratified charge surrounding the spark plug.

The medium boiling point fuel fraction is preferably injected as a condensed liquid into another predetermined region of the engine intake system such that it is subsequently drawn into the combustion chamber to form a stratified cloud at a distance from the spark plug. Alternatively, the medium boiling point fuel fraction may be injected as a condensed liquid directly into the combustion chamber towards the main volume of the engine cylinder during the engine intake period or early in the compression period to form a homogeneous charge at a distance from the spark plug. As a further possibility, the medium boiling point fuel fraction may be fed as a vapour directly into the engine intake system.

The low boiling point fuel fraction forming only a small proportion of the total fuel (approximately 5% by volume) may be introduced as a vapour into the engine intake system to join with either the first cloud or the second cloud. For cold starting of the engine, it is advantageous for the low boiling point fuel vapour to be mixed with the first cloud and to dwell in the vicinity of the spark plug so that a lean mixture can be burnt even when the engine is not fully warm.

In cases where stratified EGR is employed, the appropriate fuel fraction to be mixed with the EGR gases may be introduced directly into the EGR gases so that the fuel will follow the EGR gases and reside in the same stratified region as the EGR gases in the combustion chamber.

The controlled auto-ignition of the charge in the second cloud is not to be confused with knocking combustion occurring under high engine load conditions in a conventional spark ignition engine. Knocking combustion is undesirable and is to be avoided because of the extremely high combustion pressure and thermal loading causing damage to the engine. Knocking combustion is uncontrolled auto-ignition of part of the end gas when the engine is operated at or above the knock limit for the particular fuel blend used in the engine at the compression ratio of the engine.

Controlled auto-ignition at low and medium loads is safe because the combustion pressure and thermal loading are not excessive. It is also desirable because of the improved combustion stability and reduced NOx emissions. Such combustion is however not achievable in a conventional engine using the full fuel blend because the fuel blend will be operated well below its knock limit and combustion will proceed normally to completion without getting into knock or auto-ignition.

In the invention, the fuel is separated into its different boiling point fractions and the fraction with the low knock limit is used to achieve auto-ignition when desired under low and medium load conditions. The full fuel blend remains always available for high load operation without risk of knock. Furthermore the invention uses spark ignition as a precondition leading to auto-ignition thereby enabling the timing of the auto-ignition to be accurately controlled for optimum thermal efficiency over a wide range of operating conditions.

BRIEF DESCRIPTION OF THE DRAWINGS

The invention will now be described further, by way of example, with reference to the accompanying drawings, in which.

DETAILED DESCRIPTION OF THE PREFERRED EMBODIMENTS

Figure 2:
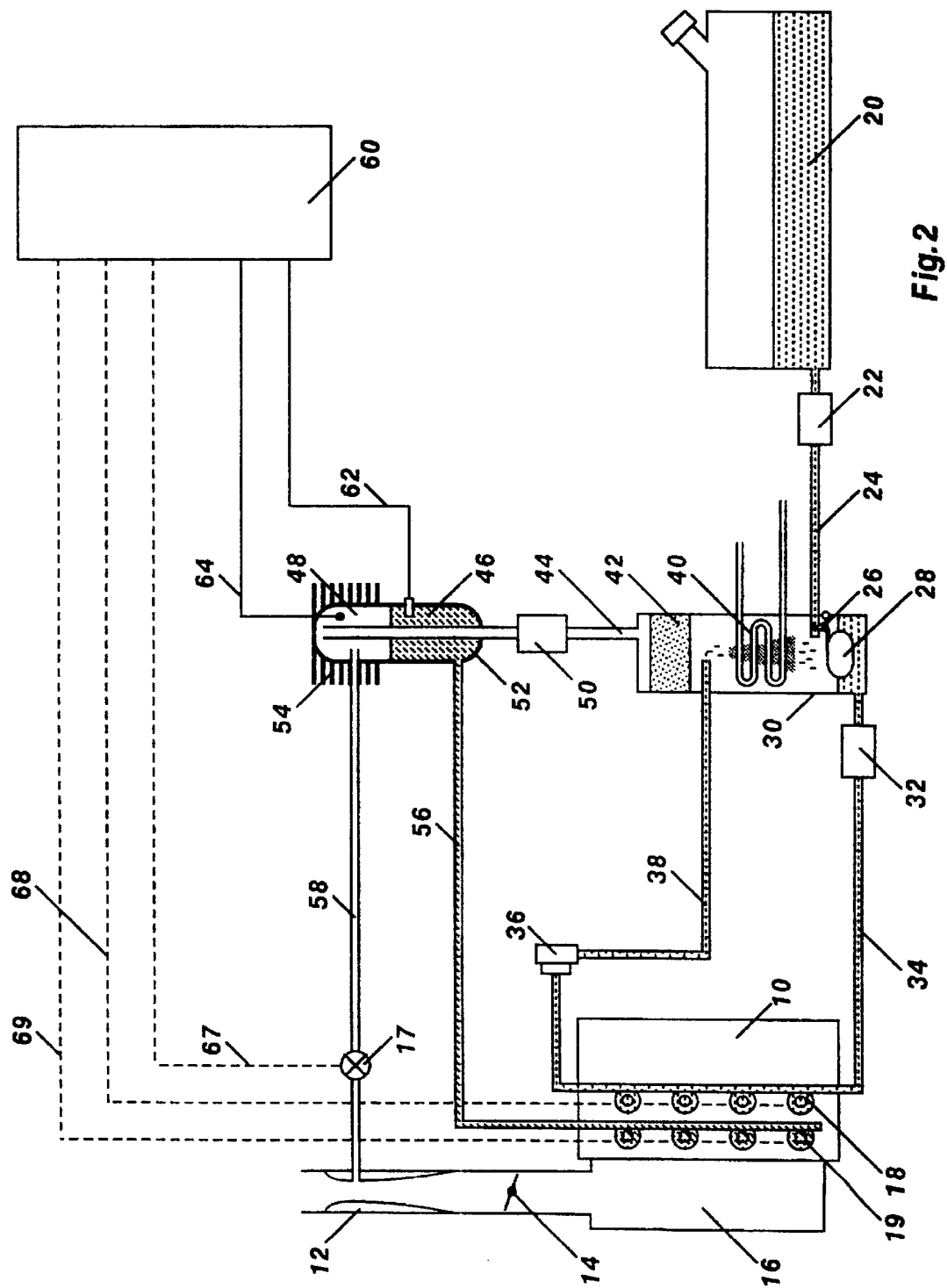
FIG. 2 is a schematic diagram of a fuel fractioning system for separating a gasoline fuel into three fractions, this being the subject of copending British Patent Application No. GB 9721296.3.

Referring first to FIG. 2, this shows an engine 10 having an intake manifold 16 that draws air from the ambient atmosphere by way of a venturi 12 and a main butterfly throttle 14. The fuelling system comprises a main storage tank 20 from which fuel is drawn by a pump 22 and supplied to a boiler 30 by way of a pipe 24.

The boiler 30 forms part of a closed circulation loop. At the bottom of the boiler 30 there is a float 28 and a needle valve 26 which maintains a constant level of fuel in the boiler 30, only drawing from the fuel tank 20 enough fuel to meet the demand of the engine. The fuel is drawn by a pump 32 from the bottom of the boiler 30 and supplied to a pressurised fuel rail 34, the pressure within which is maintained constant by a pressure relief valve 36. Excess fuel drawn from the fuel rail by the pressure relief valve 36 is returned to the boiler 30 and is dripped over a heat exchanger unit 40 that is heated by the engine coolant to a temperature of approximately 100° C. The fuel circulates rapidly around the loop as only a small proportion of the fuel delivered by the fuel pump 32 is required to meet the engine demand and, as a result, substantially the entire fraction of the fuel having a boiling point below 100° C. would be evaporated during the recirculation leaving only the higher boiling point liquid in the fuel rail 34. Thus the fuel injected by the fuel injectors 18 from the fuel rail 34 has low volatility and is composed mainly of the aromatic compounds of the fuel with high octane rating.

The vapour from the boiler 30 passes through a vapour storage canister 42 and a pipe 44 to a compressor 50 operating at typically 10 bar as compared with the 3 bar pressure in the fuel rail 34. The compressed vapour is fed into a pressurised storage reservoir 52 that has cooling fins 54 to cool the vapour to approximately 40° C. The cooled vapour condenses to a liquid 46 in the bottom of the storage reservoir 52 and is supplied at high pressure to a second fuel rail 56 that is connected to a second set of fuel injectors 19. When the fuel injectors 19 are opened, they supply to the engine cylinders a fuel blend having boiling points of between 40° C. and 100° C. at the pressure of 10 bar and is composed mainly of the heavier paraffins and olefins of the fuel with low octane rating.

The vapour fraction that does not condense remains as vapour in the ullage space 48 of the storage reservoir 52 and is supplied at high pressure to the venturi 12 by way of a pipe 58 and a gas injector 17. When the gas injector 17 is open, it supplies to the engine cylinders the most volatile fraction of the fuel containing mainly the lighter paraffins with intermediate octane rating.

Figure 1:
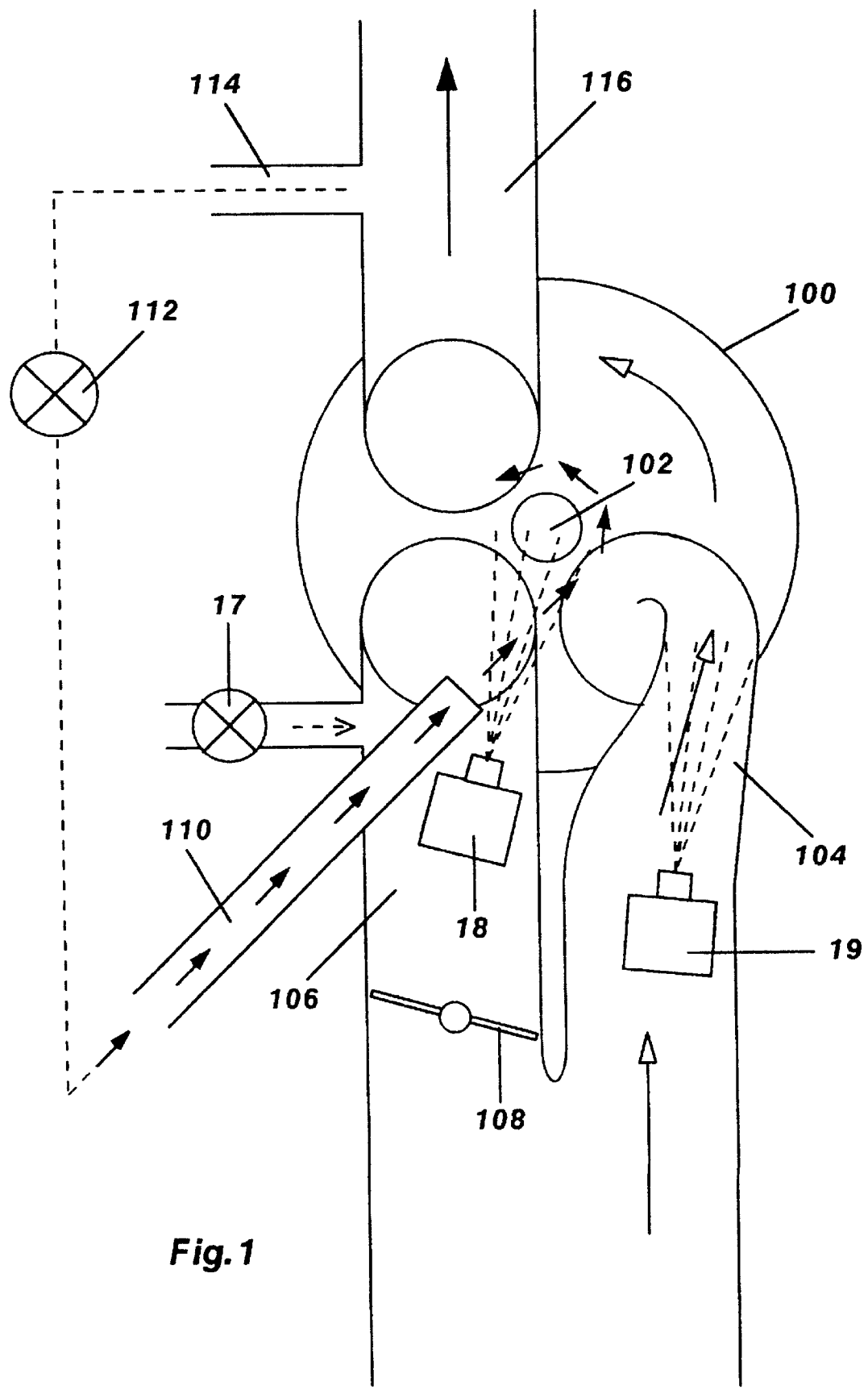
FIG. 1 is a schematic diagram of an engine for burning fuel that has previously been separated into different boiling point fractions.

In FIG. 1, the three fuel injectors 17, 18 and 19, supplying the low, high and medium boiling point fuel fractions, respectively, are shown in the positions that they occupy in the intake system of an engine embodying the present invention.

FIG. 1 shows a combustion chamber 100 that has two intake valves and one exhaust valve (not numbered) surrounding a spark plug 102. The intake port 104 leading to the valve shown on the right of the drawing is designed as a swirl port and contains the fuel injector 19 that delivers the medium boiling point fuel fraction. The air and fuel entering through this port 104 swirls in the direction of the arrow and form an annular cloud at the periphery of the combustion chamber remote from the spark plug 102.

The intake port 106 leading to the valve shown on the left of the drawing includes a de-activation valve 108 which is closed at low and medium loads and is open only during high load operation. This port 106 has the high boiling point fuel fraction injected into it by means of the fuel injector 18. In addition, an EGR pipe 110 opens into the intake port 106 and delivers exhaust gases drawn from the exhaust system 116 through a branch 114 that contains an EGR control valve 112. Lastly, the low boiling point fuel fraction is introduced into the intake port 106 through a valve 17.

Under full load operation, with the de-activation valve 108 open, the intake charge enters equally through both intake ports 104, 106 and there is no tendency for the charge to swirl. The charge is therefore not stratified and homogeneously mixed in the combustion chamber 100 so that full load performance of the engine is unaffected by the initial fractioning and subsequent recombination of the fuel.

The invention does however affect the fuel distribution under low and medium load operation when the port 106 is deactivated by closing of the butterfly valve 108. Under these conditions, the intake charge will swirl anti-clockwise as viewed, with a small part of the charge entering at low velocity from the de-activated port 106 towards the spark plug 102 to form a first cloud, and the remaining main charge entering at high velocity via the swirl port 104 to form an annular second cloud distant from the spark plug 102. The first cloud will contain EGR gases and the high and low boiling point fuel fractions both of which have high octane rating, while the second cloud will contain the medium boiling point fuel fraction having low octane rating.

When a spark is fired, the charge near the spark plug is readily ignitable and a flame will propagate radially away from the spark plug. Ahead of the flame front, the charge is heated and compressed and a point is reached when the second cloud, having a low auto-ignition threshold, will spontaneously ignite. This spontaneous combustion is safe because it will not produce excessive pressure rise or thermal loading on the engine but will significantly reduce the NOx emissions. The introduction of EGR gases into the first cloud will also create a concentration of hot active radicals surviving from the previous combustion cycles that will both assist in ignition of the first cloud and promote spontaneous combustion in the second cloud.

Cold starting and warm up are also assisted by the fact that the readily ignitable low boiling point fuel fraction is made to reside in the vicinity of the spark plug.

What is claimed is:

1. A method of operating a gasoline internal combustion spark ignition engine, which comprises separating the gasoline fuel by boiling point into at least two fractions, and separately supplying the fuel fractions to the combustion chamber of the engine in such a manner as to achieve in each cylinder a two-zone stratification of the charge at the instant of spark when the engine is operating at low and medium loads, the two-zone stratification consisting of two contiguous mixture clouds, a first of the two clouds lying in the vicinity of the spark plug and containing a higher concentration of the higher boiling point fuel fraction than the second cloud lying at a distance from the spark plug, the average composition of the fuel and the fuel-to-air ratio in the said second cloud being such that the second cloud undergoes auto-ignition subsequent to the instant of spark ignition of the first cloud, the auto-ignition of the second cloud being brought about by the increased temperature and pressure resulting from the advancing flame front in the first cloud and the timing of the auto-ignition of the second cloud thereby occurring at a predetermined time delay after the instant of spark ignition of the first cloud.

2. A method as claimed in claim 1, wherein the fuel is separated into three fractions, namely low, medium and high boiling point fractions.

3. A method as claimed in claim 2, wherein the medium boiling point fraction comprises the components of the fuel have boiling points in the temperature range from 40° C. to 100° C., the low and high boiling point fractions comprising the remaining components of the fuel having boiling points below and above this temperature range, respectively.

4. A method as claimed in claim 1, wherein exhaust gases are recirculated to the engine, either externally or internally.

5. A method as claimed in claim 4, wherein the concentration of EGR gases is stratified into two zones one near and the other distant from the spark plug.

6. A method as claimed in claim 5, wherein the higher concentration of EGR gases is located in the first cloud lying near the spark plug.

7. A method as claimed in claim 1, wherein the fuel fraction with the higher or highest boiling point is injected as a liquid into a predetermined region of the engine intake system such that it is subsequently drawn into the combustion chamber to form a stratified cloud in the vicinity of the spark plug.

8. A method as claimed in claim 2, wherein the medium boiling point fuel fraction is injected as a condensed liquid into a predetermined region of the engine intake system such that it is subsequently drawn into the combustion chamber to form a stratified cloud at a distance from the spark plug.

9. A gasoline internal combustion spark ignition engine having a fuel fractioning system (30) for separating the gasoline fuel by boiling point into at least two fractions, and means (17, 18, 19) for separately supplying the fuel fractions to the combustion chamber (100) of the engine in such a manner as to achieve in each cylinder a two-zone stratification of the charge at the instant of spark when the engine is operating at low and medium loads, the two-zone stratification consisting of two contiguous mixture clouds, a first of the two clouds lying in the vicinity of the spark plug (102) and containing a higher concentration of the higher boiling point fuel fraction than the second cloud lying at a distance from the spark plug (102), the average composition of the fuel and the fuel-to-air ratio in the said second cloud being such that the second cloud undergoes auto-ignition subsequent to the instant of spark ignition of the first cloud, the auto-ignition of the second cloud being brought about by the increased temperature and pressure resulting from the advancing flame front in the first cloud and the timing of the auto-ignition of the second cloud thereby occurring at a predetermined time delay after the instant of spark ignition of the first cloud.

* * * * *